Oct. 16, 1962 W. J. REISELT 3,058,647
MULTI-PLY BAG
Filed Feb. 10, 1960 2 Sheets-Sheet 1

INVENTOR.
WM. J. REISELT
BY E. J. Haller and
W. A. Schaich
ATTORNEYS

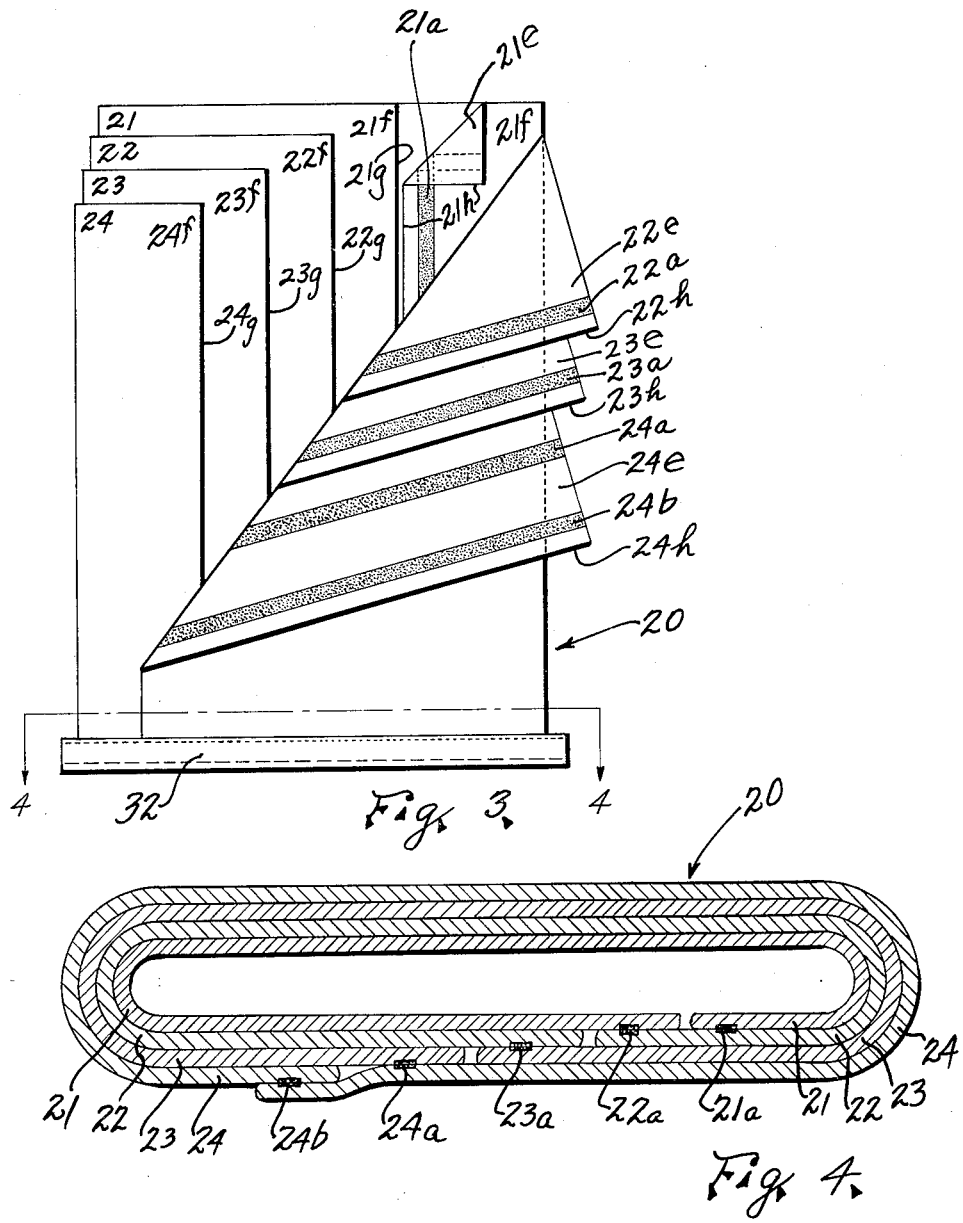

United States Patent Office 3,058,647
Patented Oct. 16, 1962

3,058,647
MULTI-PLY BAG
William J. Reiselt, Valdosta, Ga., assignor to Owens-Illinois Glass Company, a corporation of Ohio
Filed Feb. 10, 1960, Ser. No. 7,934
2 Claims. (Cl. 229—55)

This invention relates generally to bags, and more particularly to multi-ply bags.

Multi-ply bags are well known in the art. The bags are made from multi-ply paper tubing, in which each ply of the tubing has a longitudinal tube seam made by overlapping margins of the respective ply and adhering to the margins together by a stripe of adhesive. This type of seam construction is further characterized by having each ply independent of the ply adjacent to it, thereby forming, in effect, a plurality of tubes telescoped together, each tube being independent of the others.

The present invention is directed primarily to an improved seam construction for multi-ply bags and the method for forming the multi-ply tubing, wherein one or more plies may have abutting edges instead of overlapped edges, and wherein each ply does not function independently of the others, but instead is adhesively bonded to plies adjacent to it, to give a seam which requires less material and which is stronger.

Accordingly, it is an object of this invention to provide an improved seam construction for multi-ply bags wherein one or more of the plies do not need to have overlapping margins, thereby making possible substantial savings in the amount of paper used in the commercial production of such bags.

Another object of this invention is to provide an improved seam construction for multi-ply bags wherein each ply is joined to the plies adjacent to it, thereby providing improved tensile strength across the seam of the bag.

A still further object of this invention is to provide an improved method for forming multi-ply tubing.

The specific nature of this invention, as well as other objects and advantages thereof, will become apparent to those skilled in the art from the following detailed description taken in conjunction with the annexed sheets of drawings, on which, by way of example only, the preferred embodiments of this invention are illustrated.

As represented by the drawings:

FIG. 3 is a view in elevation of a modified multi-ply bag made in accordance with this invention, with the plies shown peeled away to some extent in order to exhibit the seam construction.

FIG. 4 is an enlarged cross-section taken on line 4—4 of FIG. 3.

Corresponding reference characters indicate corresponding parts throughout the several views in the drawing.

Figure 1:
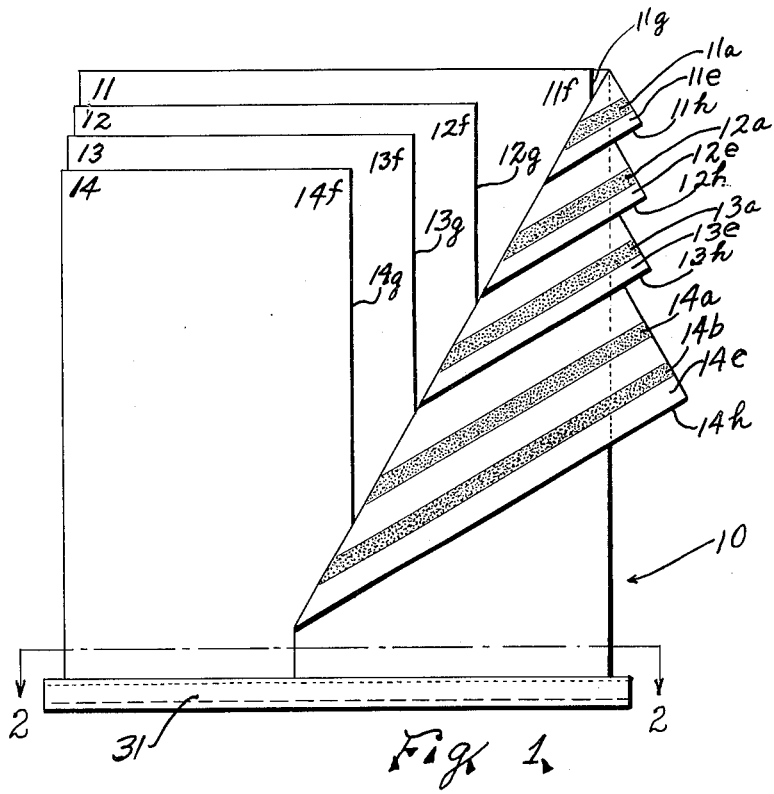
FIG. 1 is a view in elevation of a multi-ply bag made in accordance with this invention, with the plies shown peeled away to some extent in order to exhibit the seam construction.
Figure 2:
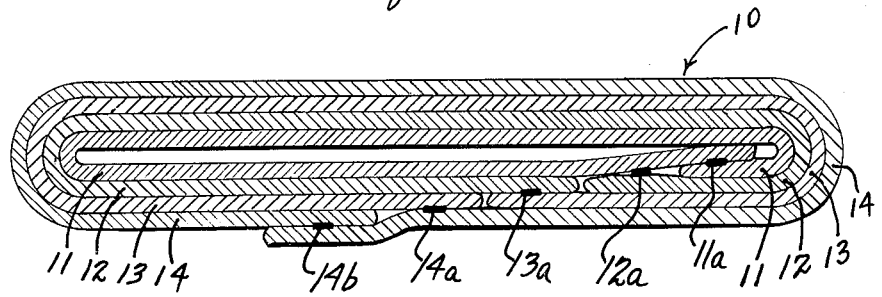
FIG. 2 is an enlarged cross-section taken on line 2—2 of FIG. 1.

Referring to the drawings, a specific embodiment of the bag of this invention is illustrated in FIGS. 1 and 2. As shown, the multi-ply bag 10 is of four-ply construction, the inner ply being designated 11, the first intermediate ply next to the inner ply being designated 12, the second intermediate ply being designated 13, and an outer ply being designated 14. The bag 10, as shown, has a bottom closure 31. The bottom closure 31 is shown by way of example as a conventional taped and stitched type of closure, well known in the art, and it is to be understood that any other suitable conventional closure may be used, the particular type of closure being relatively unimportant insofar as this invention is concerned. Bag 10 is shown as a plain ungusseted bag, but it is also to be understood that the invention is applicable to a gusseted bag.

Referring to FIG. 1, the inner ply 11, which is folded to form a tube, has an inner surface 11$e$, an outer surface 11$f$, longitudinal edges 11$g$ and 11$h$, and an adhesive stripe 11$a$. The adhesive stripe 11$a$ is located on the inner surface 11$e$, and adjacent and parallel to the longitudinal edge 11$h$. The inner ply 11 is overlapped in conventional fashion so that the adhesive stripe 11$a$ contacts the outer surface 11$f$ and adhesively bonds the inner surface 11$e$ to the outer surface 11$f$, thereby forming a closed tube.

The ply spaced outwardly from the inner ply 11, the first intermediate ply 12, has an inner surface 12$e$, an outer surface 12$f$, longitudinal edges 12$g$ and 12$h$, and an adhesive stripe 12$a$. This adhesive stripe 12$a$ is located on the inner surface 12$e$, and adjacent and parallel to one longitudinal edge 12$h$. The first intermediate ply 12 is folded around the inner ply 11 to form a tube having abutting longitudinal edges 12$g$ and 12$h$. The line of abutment is laterally offset from the longitudinal edges 11$h$ of the inner ply 11. This lateral offset is such that the adhesive stripe 12$a$ will contact the outer surface 11$f$ of the inner ply 11, thereby adhesively bonding the inner surface 12$e$ of the first intermediate ply 12 to the outer surface 11$f$ of the inner ply 11.

Spaced outwardly from the first intermediate ply 12 is the second intermediate ply 13, which is similar to the first intermediate ply 12. The second intermediate ply 13 has an inner surface 13$e$, an outer surface 13$f$, longitudinal edges 13$g$ and 13$h$, and an adhesive stripe 13$a$. This adhesive stripe 13$a$ is located on the inner surface 13$e$, and adjacent and parallel to one longitudinal edge 13$h$. The second intermediate ply 13 is folded around the first intermediate ply to form a tube having longitudinal edges 13$g$ and 13$h$ in abutment. The line of abutment is laterally offset from the longitudinal edge 12$h$ of the first intermediate ply 12 in the same direction as the first intermediate ply 12 was laterally offset from the area of overlap of the inner ply 11. This lateral offset is such that the adhesive stripe 13$a$ will contact the outer surface 12$f$ of the first intermediate ply 12, thereby adhesively bonding the inner surface 13$e$ of the second intermediate ply 13 to the outer surface 12$f$ of the first intermediate ply 12.

The outer ply 14, which is spaced outwardly from the second intermediate ply 13, has an inner surface 14$e$, an outer surface 14$f$, longitudinal edges 14$g$ and 14$h$, and two longitudinally extending adhesive stripes 14$a$ and 14$b$ located on the inner surface 14$e$. The outer ply 14 is folded around the second intermediate ply 13 to form a tube having overlapped longitudinal edges 14$g$ and 14$h$. The area of overlap is offset from longitudinal edge 13$h$ of the second intermediate ply 13, so that the first-mentioned adhesive stripe 14$a$, which is located outside the area of overlap, will contact the outer surface 13$f$ of the second intermediate ply 13, thereby adhesively bonding the inner surface 14$e$ of the outer ply 14 to the outer surface 13$f$ of the second intermediate ply 13. The second-mentioned adhesive stripe 14$b$ is located so that it will contact the outer surface 14$f$ in the area of overlap and adhesively bond the inner surface 14$e$ and the outer surface 14$f$ together to close the outer ply 14.

With all the plies adhesively bonded in a manner described above, a complete tube seam will be formed for each ply. The tube seam for the intermediate plies is formed by securing their respective longitudinal edges to the adjacent plies.

The adhesive used to form the adhesive stripes may be of any suitable conventional type, such as is customarily used in making paper bags, for example vegetable or dextrin glue, rubber base adhesive, or the like, the type of adhesive being relatively unimportant as far as the invention is concerned. Individual stripes may be continuous or discontinuous, as a particular application may require.

It is to be understood that the term "abutting," as it is found throughout this specification, is used in its broadest sense, that is, it is intended to also include the case where two "abutting" edges are spaced slightly apart or are slightly overlapped. In practice, it is undesirable to attempt to make two edges absolutely abutting because slight variations will cause the edges to ride over or under each other thereby giving a rough seam.

It is preferred that the stripes of adhesive on the inner and outer plies of a bag made in accordance with this invention be laterally offset from the edges of the plies to insure that when the various plies are pressed together no adhesive will be exposed inwardly of the inner ply 11, thereby avoiding any sticking together of the front and back of the bag, and also to insure that no adhesive will be exposed outwardly of the longitudinal edge 14h of the outer ply 14, thereby preventing the sticking together of adjacent bags.

A variation or second embodiment of the present invention is illustrated in FIGS. 3 and 4. The second embodiment is identical to the first-described embodiment with the exception of the inner ply 21, which is similar to the intermediate plies, that is, its longitudinal edges 21g and 21h are abutting and not overlapped.

Referring to FIG. 3, the inner ply 21 has an inner surface 21e, an outer surface 21f, longitudinal edges 21g and 21h, and a longitudinally extending adhesive stripe 21a. The adhesive stripe 21a is located on the outer surface 21f and adjacent to the longitudinal edge 21h. The inner ply 21 is folded so that its longitudinal edges 21g and 21h are abutting.

The next ply, the first intermediate ply 22, has an inner surface 22e, an outer surface 22f, longitudinal edges 22g and 22h, and a longitudinally extending adhesive stripe 22a. The adhesive stripe 22a is located on the inner surface 22e, parallel and adjacent to the longitudinal edge 22h. The first intermediate ply 22 is folded to form a tube around the inner ply 21, and has its longitudinal edges 22g and 22h abutting and laterally offset from the longitudinal edges 22g and 22h of the inner ply 21. This lateral offset allows the adhesive stripe 22a to contact the inner ply 21, thereby adhesively securing the first intermediate ply 22 and the inner ply 21 together.

The next ply, the second intermediate ply 23, has an inner surface 23e, and an outer surface 23f, longitudinal edges 23g and 23h, and a longitudinally extending adhesive stripe 23a. The adhesive stripe 23a is located on the inner surface 23e and parallel and adjacent to one longitudinal edge 23h. The second intermediate ply 23 is folded around the first intermediate ply 22 and has its longitudinal edges 23g and 23h abutting and laterally offset from the longitudinal edges 22h and 22g of the first intermediate ply, thereby permitting its adhesive stripe 22a to contact and bond the inner surface 23e of the second intermediate ply 23 to the outer surface 22f of the first intermediate ply 22.

The outer ply 24 has an inner surface 24e, an outer surface 24f, longitudinal edges 24g and 24h, and two longitudinally extending adhesive stripes 24a and 24b. The outer ply 24 is folded so that its longitudinal edges 24g and 24h overlap. The first-mentioned adhesive stripe 24a, which is located on the inner surface 24e, is positioned so that it will contact and bond the outer surface 23f of the second intermediate ply 23 to the inner surface of 24e of the outer ply. The second-mentioned adhesive stripe 24b, which is also located on the inner surface 24e, is positioned so that it will contact the outer surface 24f of the outer ply 24 in the area of overlap, thereby bonding the two surfaces together.

The bag 20, as illustrated in FIG. 3, has a bottom closure 32 which is a conventional taped and stitched type of closure well known in the art, and is shown by way of example only. It is to be understood that any other suitable conventional closure may be used.

The preferred locations of the various stripes of adhesives are given in this specification; but it is to be understood that any stripe could be located equally well on the ply cooperating with the ply on which it was described as being located, since the purpose of the stripe of adhesive is merely to adhesively secure the two plies together.

The manufacture of bags of this invention is generally possible on standard multi-ply paper bag machinery. Webs of material equal in number to the number of plies to be had in a finished bag are superimposed in laterally ocset relationship and formed into tubing in standard tubing apparatus. The apparatus is adjusted to obtain the proper folding of the plies required by this invention, i.e., folding some of the plies into abutting instead of into overlapping relationship, and to apply the adhesive stripes to the paper webs in the width and lateral location according to this invention. The tubing is segmented into individual lengths, and each such length is provided at least with a bottom closure. It will be understood that in many instances the bags may be valve bags and in such cases, the finished bags will also be provided by the bag manufacturer with top closures.

The various plies of the two embodiments may be formed of any suitable flexible sheet material such as kraft paper. All the plies may be of the same type of material or any suitable combination of types of material may be used. The embodiment illustrated in FIG. 1 is especially useful where the inner ply 11 is formed of a paper having moisture-proof characteristics. This is because its longitudinal edges 11g and 11h are overlapped and its outer surface 11f and inner surface 11e are adhered together to form independently of the other plies a completely closed tube.

Bags made in accordance with this invention will have the further advantage that the various plies will not have to be spot pasted together around and adjacent the mouth of the bag in order that the bag may be readily opened without separation of the plies at the mouth.

It will be understood that the four-ply bag herein illustrated is only exemplary of the invention, and that the principles of the invention are applicable to bags having two or more plies. In the case of a two-ply bag, the construction will follow that of the second embodiment shown in FIG. 3, with the intermediate plies 22 and 23 being omitted. It is also to be understood that this invention may be practiced using any number of intermediate plies.

It will, of course, be understood that various details of construction may be modified through a wide range without departing from the principles of this invention, and it is not, therefore, the purpose to limit the patent granted hereon otherwise than necessitated by the scope of the appended claims.

I claim:

1. A multi-ply bag comprising a length of multi-ply tubing having closure means located at one end thereof, said tubing having an inner ply, an outer ply, and at least one intermediate ply disposed between said inner and outer plies, said intermediate ply having inner and outer surfaces and two longitudinal edges disposed in substantially abutting relationship, said intermediate ply having its inner surface secured along one of its longitudinal edges to that play spaced inwardly therefrom and having its outer surface secured along the other of said longitudinal edges to the ply spaced outwardly therefrom, said inner ply having its seam constituted by overlapping longitudinal edges, said inner ply having its inner and outer surfaces adhesively secured together in the area of overlap, and said outer ply having overlapping longitudinal edges adhesively secured together.

2. A multi-ply bag comprising a length of multi-ply tubing having closure means located at one end thereof, said tubing having an inner ply and an outer ply, and two intermediate plies disposed between said inner and outer plies, each of said intermediate plies having inner and outer surfaces and a pair of substantially abutting longitudinal edges, said pairs of longitudinal edges being laterally offset from one another, each of said intermediate plies having its inner surfaces secured along one of its longitudinal edges to that ply spaced inwardly therefrom and having its outer surface secured along the other of said pair of longitudinal edges to the ply spaced outwardly therefrom, said inner ply having its seam constituted by overlapping longitudinal edges, said inner ply having its inner and outer surfaces adhesively secured together in the area of overlap, and said outer ply having overlapping longitudinal edges, adhesively secured together.

References Cited in the file of this patent

UNITED STATES PATENTS

| | | |
|---|---|---|
| 1,917,975 | Jaite | July 11, 1933 |

FOREIGN PATENTS

| | | |
|---|---|---|
| 680,925 | France | Jan. 23, 1930 |
| 571,719 | Britain | June 9, 1941 |